(12) United States Patent
Gross et al.

(10) Patent No.: US 10,753,553 B2
(45) Date of Patent: Aug. 25, 2020

(54) CORDLESS UNDERHOOD LIGHT WITH DETACHABLE WORK LIGHT

(71) Applicant: Black & Decker Inc., New Britain, CT (US)

(72) Inventors: Paul G. Gross, White Marsh, MD (US); David C. Veprek, Baltimore, MD (US); Crystal G. Young, Joppa, MD (US); Liang Zong, Youngor (CN); Jinjian Mo, Gusu District (CN)

(73) Assignee: Black & Decker Inc., New Britain, CT (US)

( * ) Notice: Subject to any disclaimer, the term of this patent is extended or adjusted under 35 U.S.C. 154(b) by 111 days.

(21) Appl. No.: 16/014,315

(22) Filed: Jun. 21, 2018

(65) Prior Publication Data

US 2019/0003657 A1    Jan. 3, 2019

Related U.S. Application Data

(60) Provisional application No. 62/526,495, filed on Jun. 29, 2017.

(51) Int. Cl.
*F21L 4/04* (2006.01)
*F21L 4/02* (2006.01)
(Continued)

(52) U.S. Cl.
CPC .............. *F21L 4/04* (2013.01); *B60Q 3/35* (2017.02); *F21K 9/65* (2016.08); *F21L 4/02* (2013.01);
(Continued)

(58) Field of Classification Search
CPC ....... F21K 9/65; F21L 4/02; F21L 4/04; F21S 4/20
See application file for complete search history.

(56) References Cited

U.S. PATENT DOCUMENTS

| 1,902,026 A | 3/1933 | Ward et al. |
| 2,555,000 A | 5/1951 | Nitardy et al. |

(Continued)

FOREIGN PATENT DOCUMENTS

| CN | 201916864 | 8/2011 |
| CN | 202521240 | 11/2012 |

(Continued)

OTHER PUBLICATIONS

Machine translation of Ningbo CN 202521240 (Year: 2012).*
EP ESSR, dated Sep. 6, 2018 issued in corresponding EP application No. 18180103.6.

*Primary Examiner* — Leah Simone Macchiarolo
(74) *Attorney, Agent, or Firm* — Amir Rohani

(57) ABSTRACT

A lighting device is provided including a first elongate light body supporting a first light source, a second elongate light body supporting a second light source, and first and second handles coupled to first ends of the first and second elongate light bodies. A rotary structure is disposed between second ends of the first and second elongate light bodies to support rotary movement of the first elongate light body with respect to the second elongate light body. A battery receptacle is disposed on the first elongate light body, a detachable light mount is disposed on the second elongate light body, and the detachable light mount is electrically connected to the battery receptacle. A detachable light is removably mounted on the detachable light mount.

18 Claims, 15 Drawing Sheets

(51) Int. Cl.
| | | |
|---|---|---|
| *F21S 4/20* | (2016.01) | |
| *F21L 4/08* | (2006.01) | |
| *F21L 14/02* | (2006.01) | |
| *F21V 21/08* | (2006.01) | |
| *F21W 131/402* | (2006.01) | |
| *F21V 21/088* | (2006.01) | |
| *F21V 21/40* | (2006.01) | |
| *F21V 23/06* | (2006.01) | |
| *F21V 23/04* | (2006.01) | |
| *B60Q 3/35* | (2017.01) | |
| *F21K 9/65* | (2016.01) | |
| *F21V 21/14* | (2006.01) | |
| *F21Y 115/10* | (2016.01) | |
| *F21Y 103/10* | (2016.01) | |
| *F21V 23/00* | (2015.01) | |
| *F21V 31/04* | (2006.01) | |
| *F21Y 103/00* | (2016.01) | |

(52) U.S. Cl.
CPC ............ *F21L 4/025* (2013.01); *F21L 4/027* (2013.01); *F21L 4/08* (2013.01); *F21L 14/02* (2013.01); *F21S 4/20* (2016.01); *F21V 21/0832* (2013.01); *F21V 21/14* (2013.01); *F21V 21/406* (2013.01); *F21V 23/0471* (2013.01); *F21V 23/06* (2013.01); *F21V 21/0885* (2013.01); *F21V 23/002* (2013.01); *F21V 31/04* (2013.01); *F21W 2131/402* (2013.01); *F21Y 2103/00* (2013.01); *F21Y 2103/10* (2016.08); *F21Y 2115/10* (2016.08)

(56) References Cited

U.S. PATENT DOCUMENTS

| | | | |
|---|---|---|---|
| 3,096,941 | A | 7/1963 | Miller et al. |
| 4,282,562 | A | 8/1981 | Marino |
| 5,077,643 | A | 12/1991 | Leach |
| 5,142,458 | A | 8/1992 | Brunson |
| 5,217,297 | A | 6/1993 | Yuen |
| 5,243,505 | A | 9/1993 | Carr |
| 5,258,899 | A | 11/1993 | Chen |
| 5,278,740 | A | 1/1994 | Agnelli |
| 5,432,689 | A | 7/1995 | Sharrah et al. |
| 5,465,196 | A | 11/1995 | Hasenberg et al. |
| 5,528,477 | A | 6/1996 | Carmo |
| 5,590,953 | A | 1/1997 | Haslam et al. |
| 5,595,441 | A | 1/1997 | McGee |
| 5,763,872 | A | 6/1998 | Ness |
| 6,079,858 | A | 6/2000 | Hicks |
| 6,132,071 | A | 10/2000 | Yuen |
| 6,260,985 | B1 | 7/2001 | Zeller |
| 6,601,814 | B2 | 8/2003 | Kovacik et al. |
| 6,642,667 | B2 | 11/2003 | Avis |
| 6,799,863 | B2 | 10/2004 | Offiler et al. |
| D544,977 | S * | 6/2007 | Qi .................. D26/37 |
| 7,246,927 | B2 | 7/2007 | Wikle et al. |
| 7,338,181 | B2 | 3/2008 | Yuen |
| 7,367,698 | B2 | 5/2008 | Miller |
| 7,401,940 | B2 | 7/2008 | Min |
| D575,430 | S | 8/2008 | Jiang |
| 7,465,059 | B1 | 12/2008 | Galvez |
| 7,549,770 | B2 | 6/2009 | Devaney et al. |
| 7,549,778 | B2 | 6/2009 | Chien |
| 7,553,051 | B2 | 6/2009 | Brass et al. |
| 7,591,572 | B1 | 9/2009 | Levine |
| 7,638,970 | B1 | 12/2009 | Gebhard et al. |
| 7,648,261 | B2 | 1/2010 | Ko et al. |
| 7,731,386 | B2 | 6/2010 | Levine |
| 7,967,467 | B2 | 6/2011 | Devaney et al. |
| 8,066,402 | B2 | 11/2011 | Klipstein |
| 8,072,123 | B1 | 12/2011 | Han |
| 8,087,797 | B2 | 1/2012 | Pelletier et al. |
| 8,130,099 | B2 | 3/2012 | Steinel et al. |
| 8,469,558 | B2 | 6/2013 | Carmi |
| 8,573,797 | B2 | 11/2013 | Spartano et al. |
| 8,662,699 | B2 | 3/2014 | Tarter |
| 10,001,252 | B2 * | 6/2018 | Inskeep .............. H02J 7/0052 |
| 2007/0081326 | A1 | 4/2007 | Robinson et al. |
| 2008/0117644 | A1 * | 5/2008 | Li ..................... F21L 4/00 362/496 |
| 2008/0239730 | A1 | 10/2008 | Chien |
| 2008/0212319 | A1 | 12/2008 | Klipstein |
| 2013/0148339 | A1 | 6/2013 | Noble |
| 2013/0335996 | A1 | 12/2013 | Yao et al. |
| 2014/0198510 | A1 * | 7/2014 | Law .................. B60Q 3/35 362/485 |
| 2014/0268720 | A1 | 9/2014 | Dungan et al. |
| 2015/0062883 | A1 | 3/2015 | Shen |
| 2015/0131276 | A1 | 5/2015 | Thompson et al. |
| 2015/0247628 | A1 | 9/2015 | Liu et al. |

FOREIGN PATENT DOCUMENTS

| | | |
|---|---|---|
| CN | 105318202 | 2/2016 |
| DE | 102006014716 A1 | 10/2007 |
| DE | 202009008715 U1 | 9/2009 |
| DE | 202011100159 U1 | 8/2011 |
| DE | 202012104801 U1 | 2/2013 |
| DE | 202013003786 U1 | 7/2013 |
| DE | 202015000814 U1 | 4/2015 |
| EP | 0677697 B1 | 12/1998 |
| EP | 2000737 A1 | 12/2008 |
| EP | 1820169 B1 | 4/2009 |
| EP | 2372238 B1 | 1/2014 |
| EP | 2204602 B1 | 2/2014 |
| EP | 2021682 B1 | 8/2014 |
| WO | WO2000057103 A1 | 9/2000 |
| WO | WO20130174929 A1 | 11/2013 |

* cited by examiner

CORDLESS UNDERHOOD LIGHT WITH DETACHABLE WORK LIGHT

RELATED APPLICATION

This application claims the benefit of U.S. Provisional Patent Application No. 62/526,495 filed Jun. 29, 2017, which is incorporated herein by reference in its entirety.

FIELD OF THE DISCLOSURE

This disclosure relates to a light, and in particular to an underhood light for attachment to a hood of a vehicle.

BACKGROUND

Conventional under hood lights commonly include an elongate rod and two handles located on the two ends of the rod. A light source, such as a light bulb or an array of Light Emitting Diodes (LEDs), is secured to rod between the two handles. The handles are rotatable around the rod axis and can be stretched out relative to the rod for mounting and positioning of the hood light under the hood of a vehicle.

U.S. Pat. No. 6,799,863 is an example of an underhood light with a light bulb attached to the rod via two spacers. Mac Tools Hood Light Model Nos. TL96995 and UHL2000RC are examples of underhood lights with arrays of LEDs attached to an outer surface of the rod.

Deficiencies of conventional underhood lights include difficulties in portability and storage, lack of sufficient lighting for the entire work area, difficulties in turning the light on and off as needed, etc. The present disclosure seeks to overcome some or all these problems.

SUMMARY

According to an embodiment of the invention, a lighting device is provided, which comprises: a first elongate light body, a second elongate light body, and a pair of handles coupled to first ends of the first and second elongate light bodies. A rotary structure is disposed between second ends of the first and second elongate light bodies. In an embodiment, the rotary structure includes at least one spring and at least one ratchet gear arranged to bias a relative angular position of the first and second elongate light bodies between angular settings angularly spaced apart at set increments.

In an embodiment, the angular settings are 45 degrees apart.

In an embodiment, the rotary structure includes two receiving bodies arranged to receive the second ends of the first and second elongate light bodies therein, a rotary housing disposed between the two receiving bodies, and at least one lateral socket arranged to receive the at least one ratchet gear therein.

In an embodiment, an electric connector is disposed within the two receiving bodies and the rotary housing to electrically connect the first elongate light body and the second elongate light body.

In an embodiment, each of the first and second elongate light bodies includes: a housing, an elongate circuit board mounted on the housing, an array of light emitting diodes (LEDs) mounted on the circuit board, and a lens mating with the housing to cover the array of LEDs.

According to another embodiment of the invention, a lighting device is provided including: a first elongate light body supporting a first light source, a second elongate light body supporting a second light source, and first and second handles coupled to first ends of the first and second elongate light bodies. A rotary structure is disposed between second ends of the first and second elongate light bodies to support rotary movement of the first elongate light body with respect to the second elongate light body. A battery receptacle is disposed on the first elongate light body, a detachable light mount is disposed on the second elongate light body, and the detachable light mount is electrically connected to the battery receptacle. In an embodiment, a detachable light is removably mounted on the detachable light mount.

In an embodiment, the detachable light includes a flash light having rechargeable battery therein charged via the detachable light mount.

In an embodiment, the detachable light mount includes a light mount face housing at least one terminal, at least one wall rail disposed longitudinally on the light mount face, and an elongate receiving channel for securely receiving a corresponding elongate projection of the detachable light therein.

In an embodiment, the light further includes a motion sensor disposed on the first elongate light body to control and/or cut off supply of power from the battery receptacle to the first and second light sources.

In an embodiment, each of the first and second elongate light bodies comprises: a housing; an elongate circuit board mounted on the housing; an array of light emitting diodes (LEDs) mounted on the circuit board; and a lens mating with the housing to cover the array of LEDs.

In an embodiment, a pivoting structure is provided for pivoting attachment of the first handle to the first end of the first elongate light body. In an embodiment, the pivoting structure comprises: a handle bracket cover mounted to the first end of the first elongate light body and having annular detents; and a rotary plate attached to the first handle and having pivot posts engaging the annular detents to allow the first handle to rotate in set increments about an axis of the first elongate light body. In an embodiment, a pin is disposed on the axis of the first elongate light body to axially connect the handle bracket to the rotary plate.

In an embodiment, the rotary structure includes at least one spring and at least one ratchet gear arranged to bias a relative angular position of the first and second elongate light bodies between angular settings angularly spaced apart at set increments.

In an embodiment, the battery receptacle is arranged to receive a sliding battery pack therein.

According to another embodiment, a lighting device is provided including: an elongate light body supporting a light source, first and second handles coupled to outer ends of the elongate light body, a battery receptacle disposed near one of the outer ends of the light body to slidingly receive a sliding battery pack therein, and a motion sensor disposed adjacent the battery receptacle arranged to control supply of power from the battery pack to the light source.

In an embodiment, the elongate light body includes: a first elongate light body, a second elongate light body, and a rotary structure disposed between inner ends of the first and second elongate light bodies to support rotary movement of the first elongate light body with respect to the second elongate light body.

In an embodiment, each of the first and second elongate light bodies includes: a housing, an elongate circuit board mounted on the housing, an array of light emitting diodes (LEDs) mounted on the circuit board, and a lens mating with the housing to cover the array of LEDs.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of this disclosure in any way.

Corresponding reference numerals indicate corresponding parts throughout the several views of the drawings.

DETAILED DESCRIPTION

Figure 1:
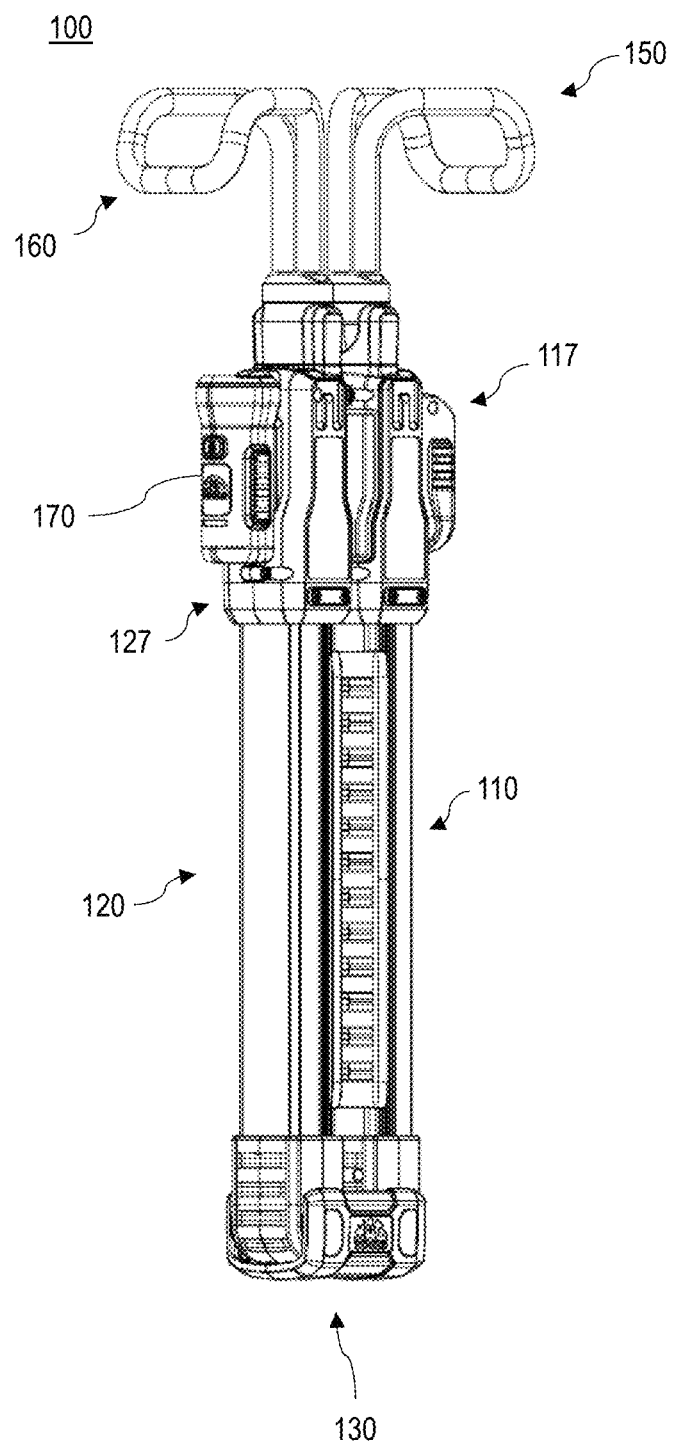
FIGS. 1 and 2 depict perspective views of an exemplary underhood light device, herein after referred to as a hood light, in a folded position, according to an embodiment of the invention.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
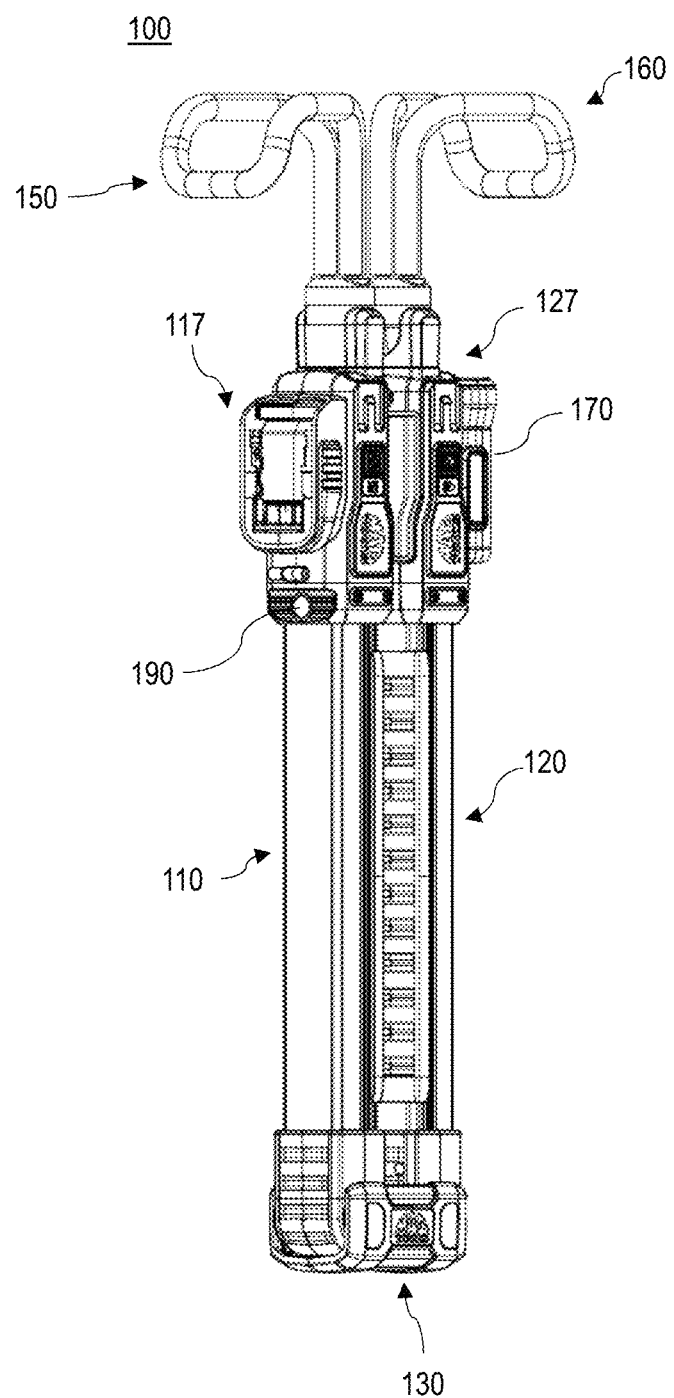
Figure 3:
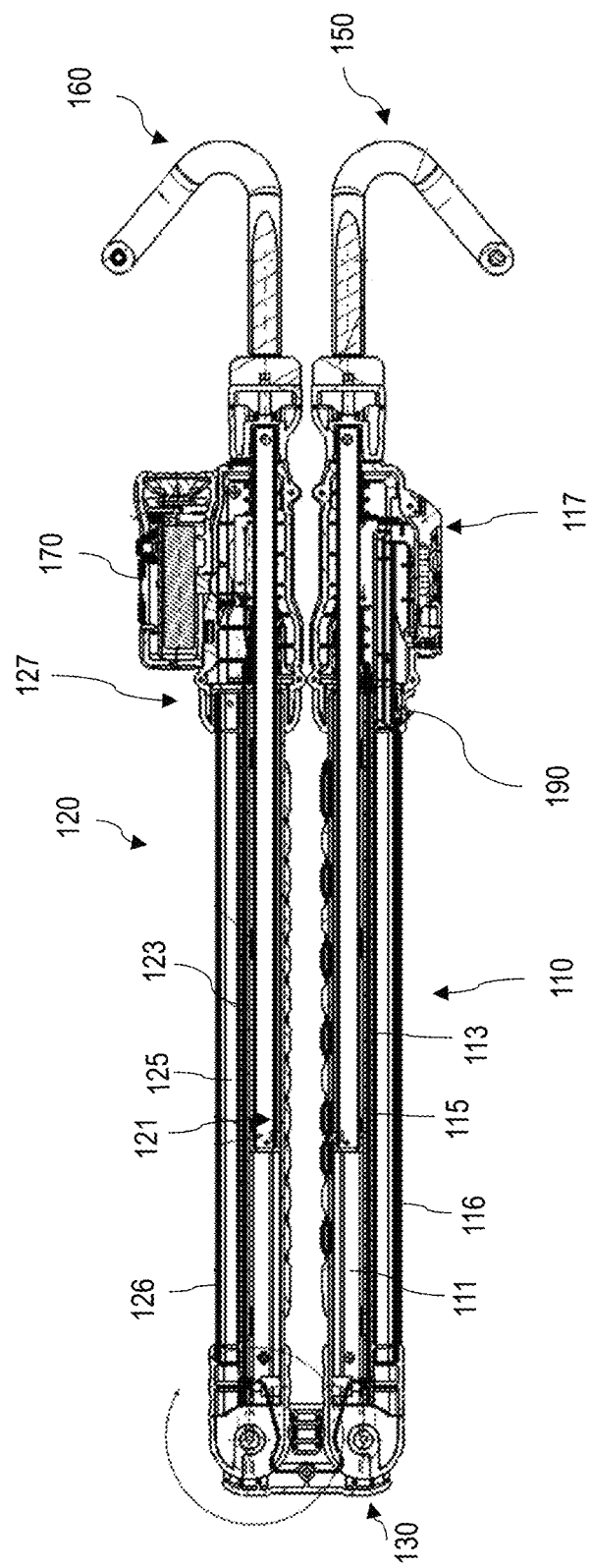
FIG. 3 depicts a side view of the hood light in a folded position, according to an embodiment.

FIGS. 1-3 depict perspective and side views of an exemplary hood light 100, according to an embodiment. The hood light 100 includes a first light body 110 and a second light body 120 that house arrays of light-emitting devices (LEDs) and are coupled together via a rotary structure 130. First light body 110 includes a battery receptacle 117 arranged to receive a sliding battery pack therein for powering the hood light 100. Second light body 120 includes a detachable light mount 127. A detachable light 170 is detachably attached to the detachable light mount 127. A first rotary hook handle 150 and a second rotary hook handle 160 are attached to the ends of the first and second light bodies 110 and 120 respectively.

Figure 4:
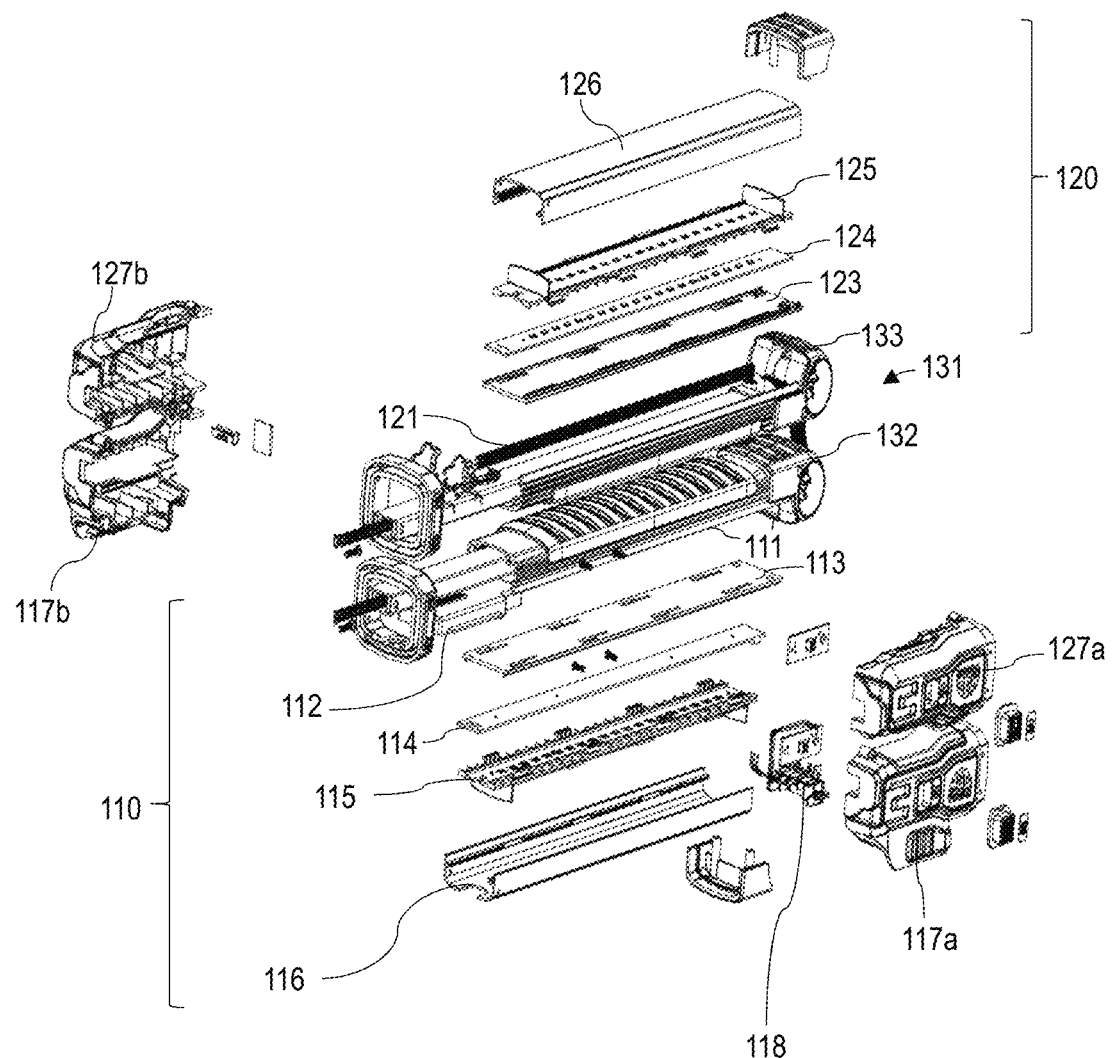
FIG. 4 depicts an exploded view of the hood light, according to an embodiment.
Figure 5:
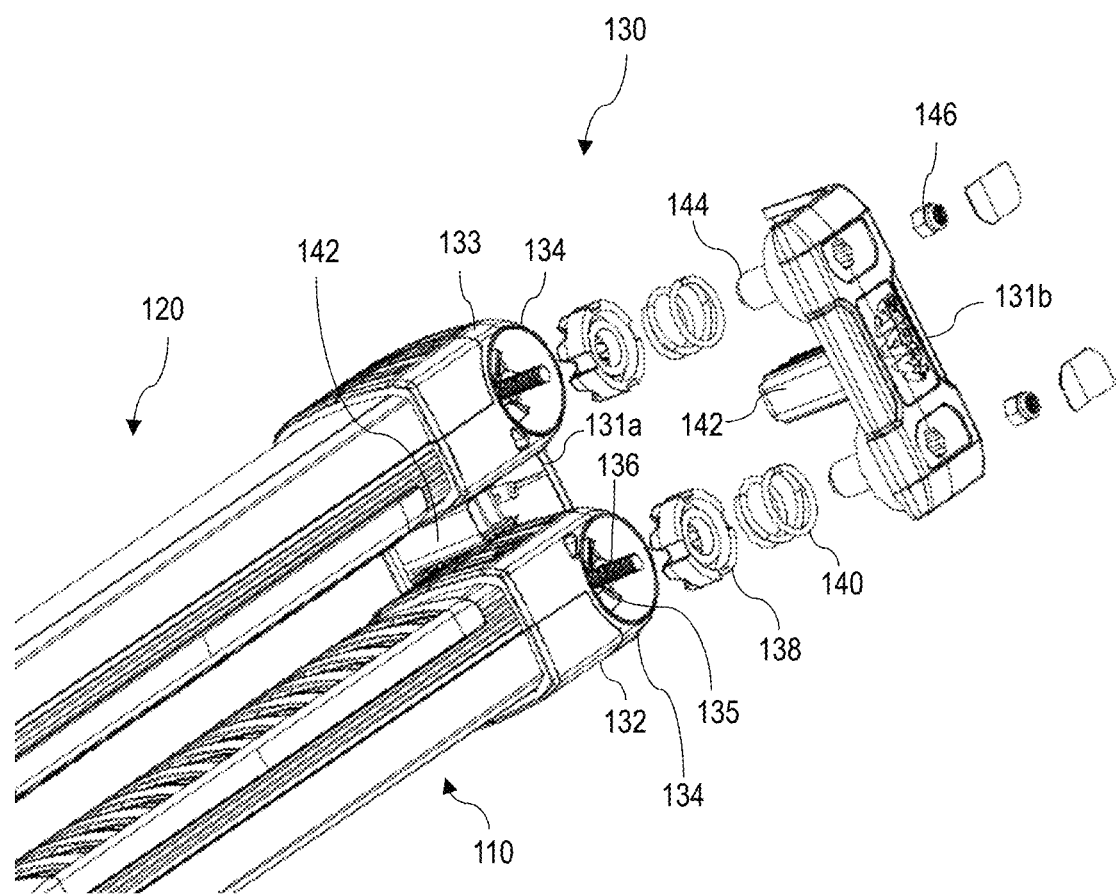
FIG. 5 depicts a partial exploded view of a rotary structure for the hood light, according to an embodiment.

Referring to the exploded view of FIG. 4, and with continued reference to FIGS. 1-3, in an embodiment, first light body 110 includes a first LED housing 111 having an elongated body, a first printed circuit board (PCB) 113 mounted on the outer face of the first LED housing 111, a first LED array 114 mounted on the first PCB 113, a first LED cover 115 attached to the first PCB 113 to cover the first LED array 114, and a first LED lens 116 coupled to the LED housing 111 to fully seal and cover the aforementioned components. A battery bracket 112 is disposed at a distal end of the first LED housing 111, and first and second battery housing halves 117a and 117b are mated around the battery bracket 112 to form battery receptacle 117 at the distal end of the first LED housing 111 across from the rotary structure 130. The battery receptacle 117 houses a battery terminal 118 therein.

Similarly, in an embodiment, the second light body 120 includes a second LED housing 121 having an elongated body, a second printed circuit board (PCB) 123 mounted on the outer face of the second LED housing 121, a second LED array 124 mounted on the second PCB 123, a second LED cover 125 attached to the second PCB 123 to cover the second LED array 124, and a second LED lens 126 coupled to the LED housing 121 to fully seal and cover the aforementioned components. First and second light mount housing halves 127a and 127b are mated together to form detachable light mount 127 at a distal end of the second LED housing 121 across from the rotary structure 130.

Referring to FIGS. 5-11, the rotary structure 130 is described herein. According to an embodiment, the rotary structure 130 includes first and second light receiving bodies 132 and 133 that securely receive the ends of the first and second light bodies 120 and 130. First and second rotary housing halves 131a and 131b mated together laterally around the first and second light receiving bodies 132 and 133. Each of the first and second light receiving bodies 132 and 133 includes lateral sockets 134 on both sides. First and second rotary housing halves 131a and 131b each include two cylindrical posts 144 that are received within the lateral sockets 134. The first and second housing halves 131a and 131b are fastened around the first and second light receiving bodies 132 and 133 via threaded fasteners 136 and nuts 146. Two inner posts 142 of the first and second housing halves 131a and 131b also mate together between the first and second light receiving bodies 132 and 133. A connector 148 (FIG. 7) including a series of wires runs through the first and second light receiving bodies 132 and 133 and the rotary structure 130 to electrically connect the first and second light bodies 110 and 120.

In an embodiment, each lateral socket 134 accommodates a gear base 135 therein. A compression spring 140 and a ratchet gear 138 is disposed around each cylindrical post 144. When the first and second housing halves 131*a* and 131*b* mate around the first and second light receiving bodies 132 and 133, the ratchet gears 138 come into engagement with the gear bases 135. The springs 140 apply a biasing force to the ratchet gears 138 towards the gear bases 135.

Figure 6:
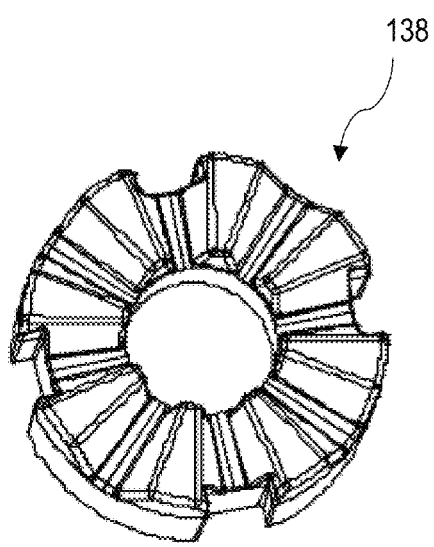
FIG. 6 is an exemplary ratchet gear used in the rotary structure for the hood light, according to an embodiment.
Figure 7:
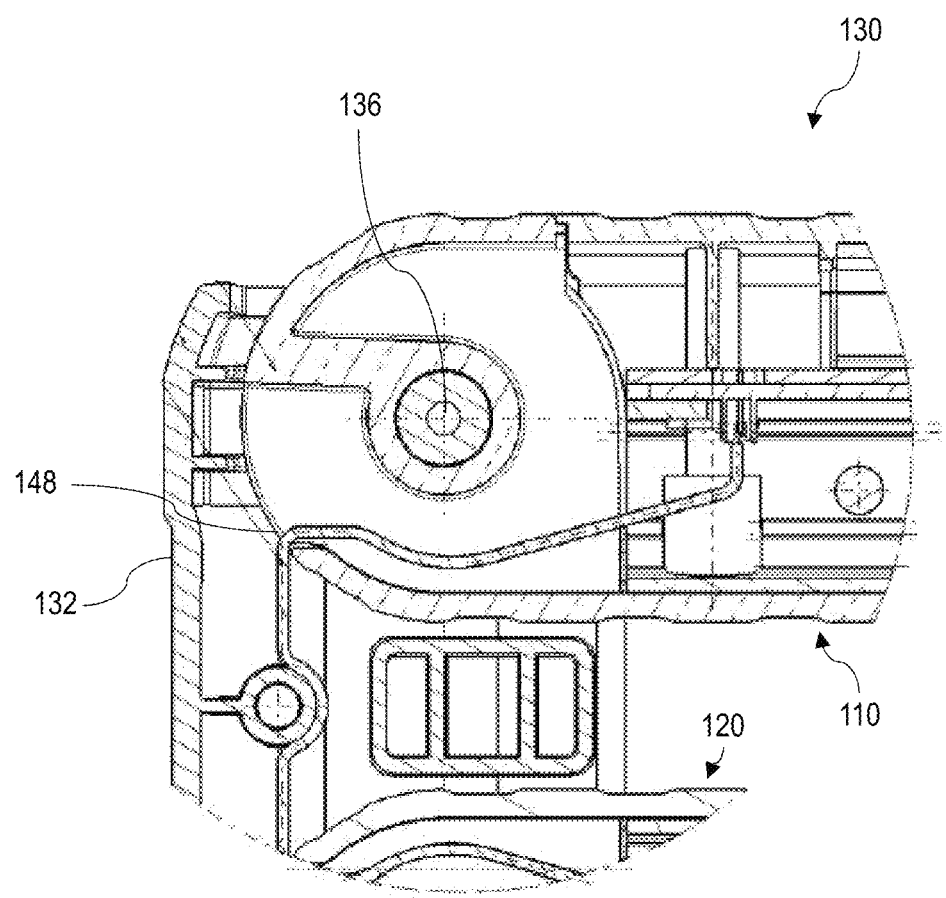
FIG. 7 depicts a side cross-sectional view of the rotary structure for the hood light, according to an embodiment.
Figure 8:
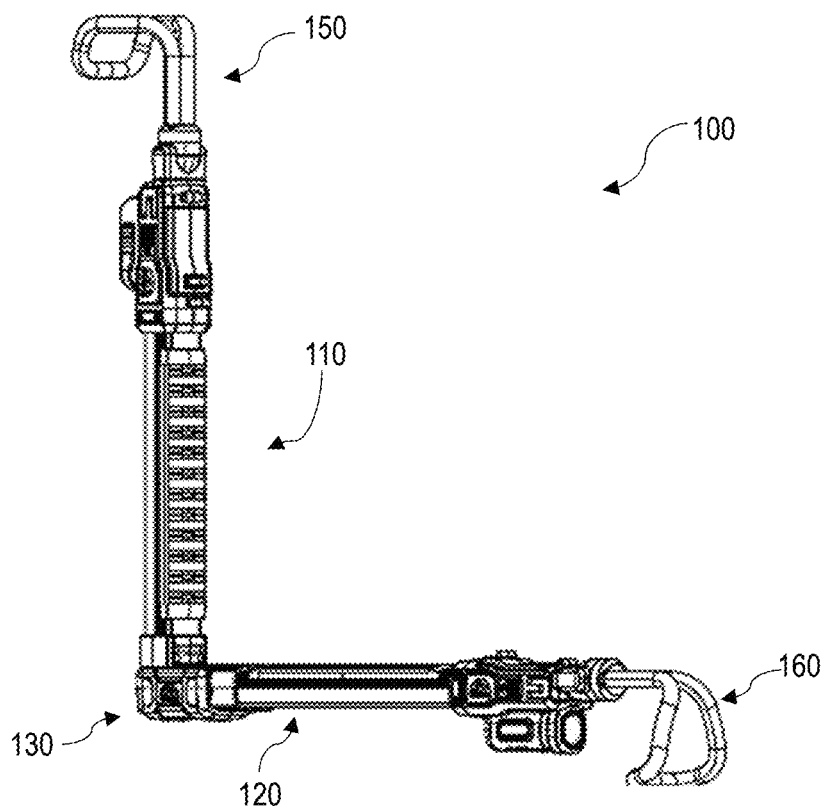
FIGS. 8-10 depict perspective views of the hood light respectively in a 90-degree orientation, 135-degree orientation, and 180-degree orientation, according to an embodiment.
Figure 9:
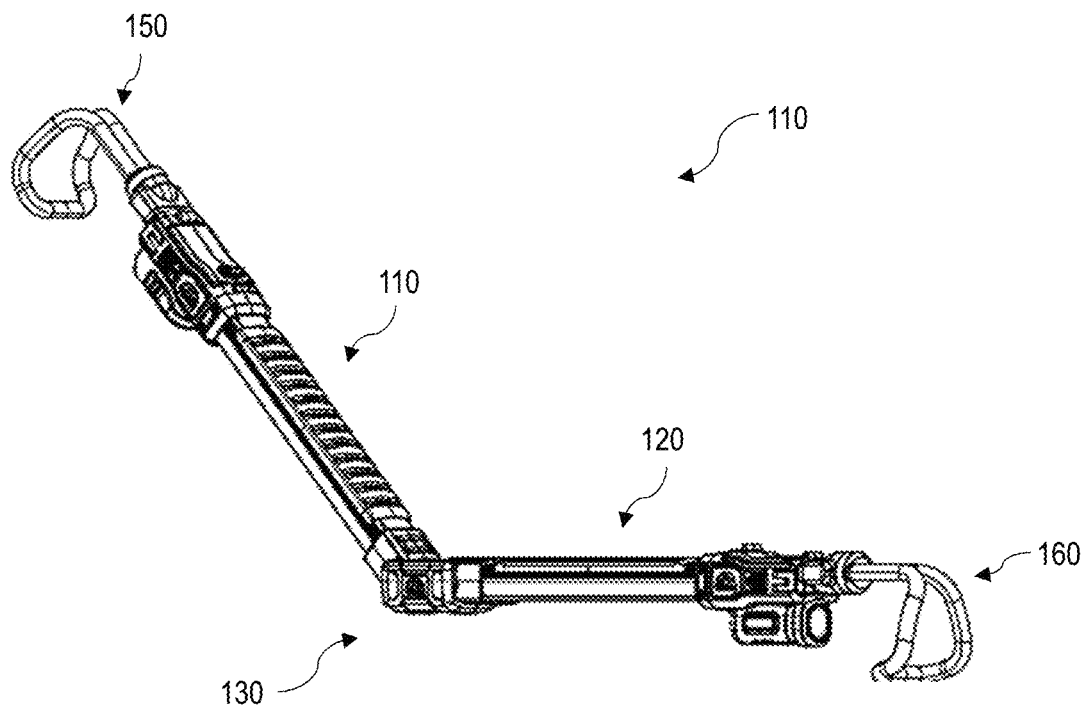
Figure 10:
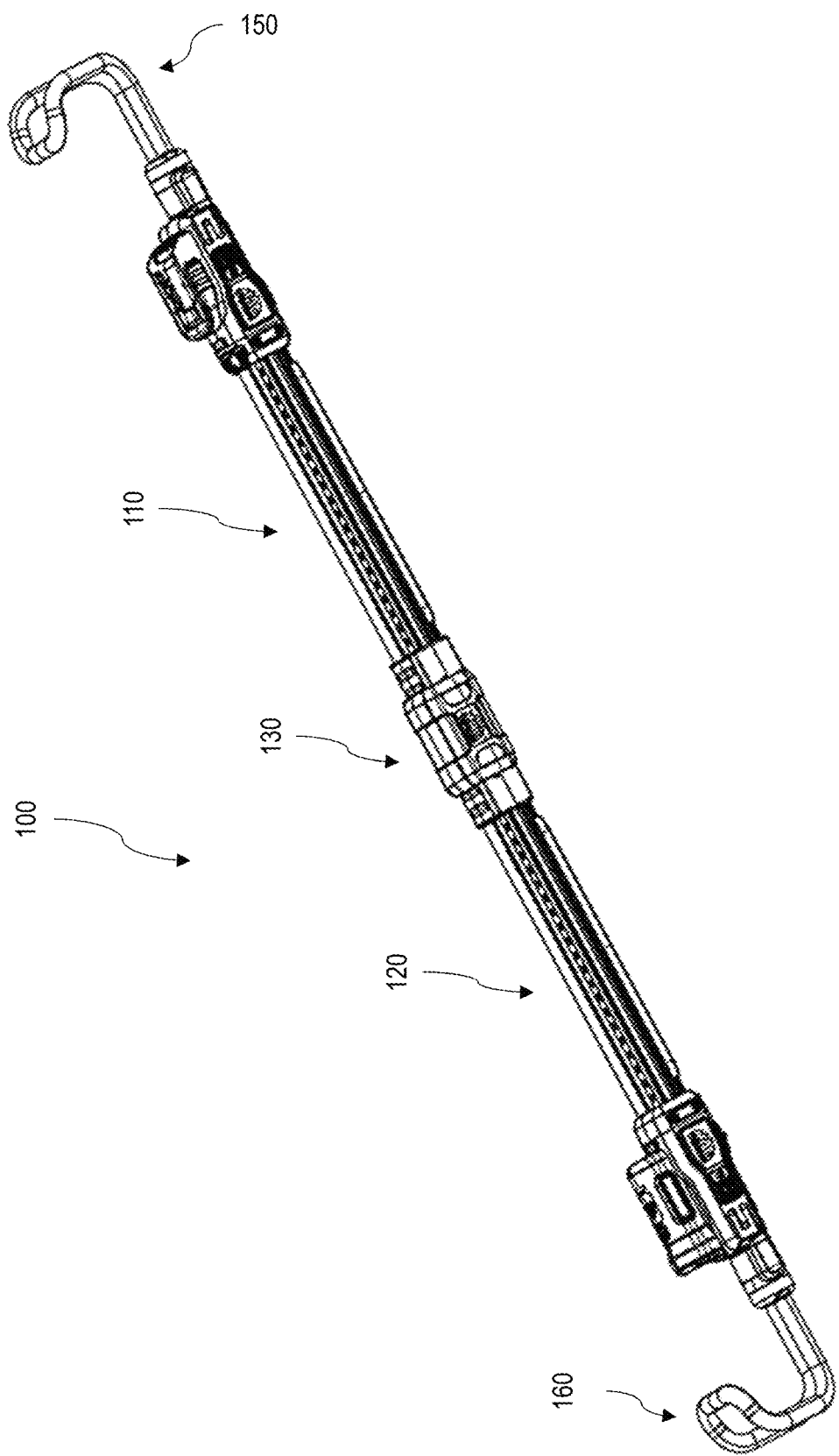
Figure 11:
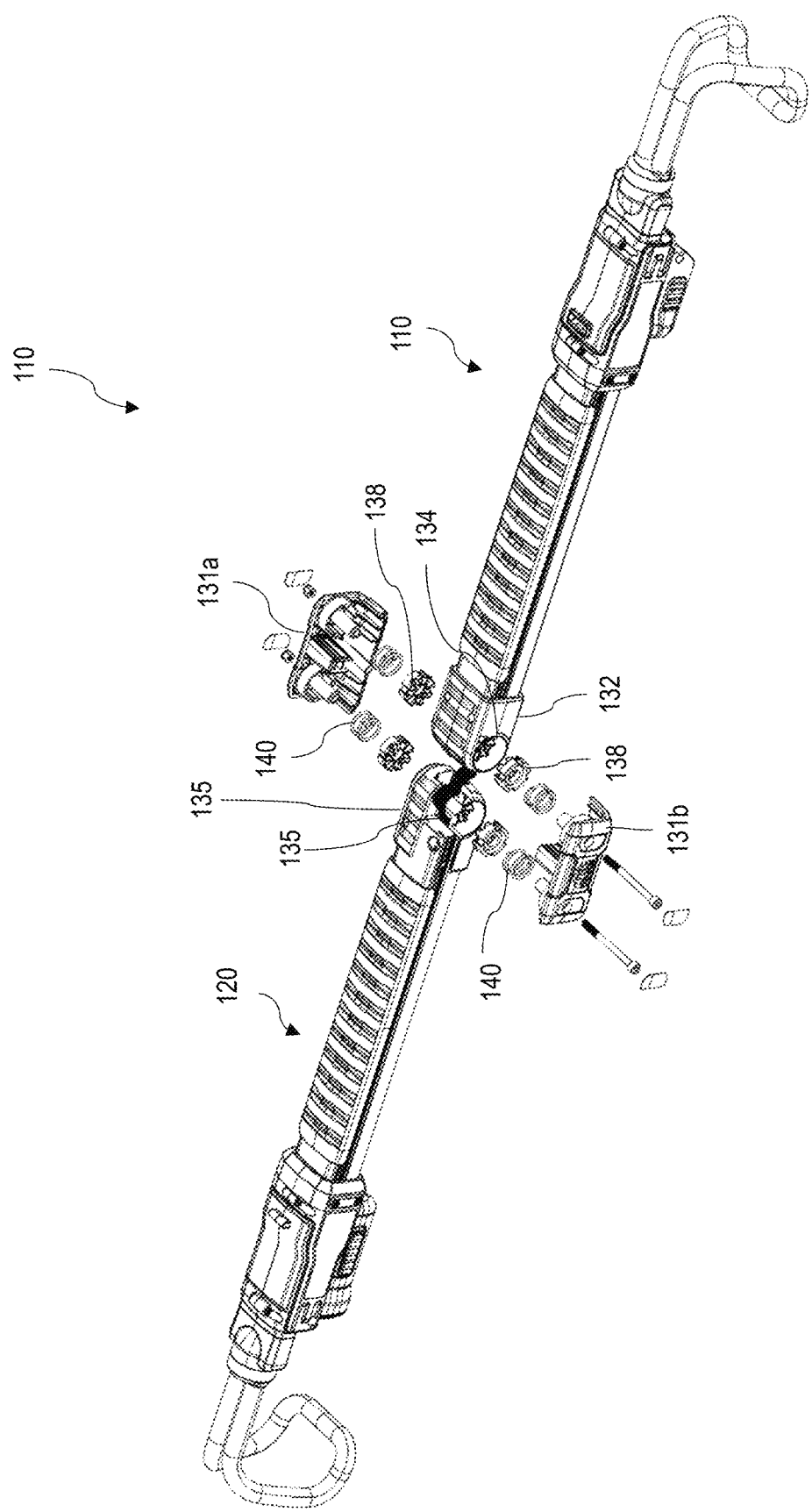
FIG. 11 depicts a perspective partially exploded view of the hood light in a 180-degree orientation, according to an embodiment.

The gear bases 135 and ratchet gears 138 are teethed. FIG. 6 depicts an exemplary ratchet gear 138 having eight teeth. The biasing engagement of the gear bases 135 and ratchet gears 138 allows each of the first and second light bodies 110 and 120 to rotate around a pivot axis of the lateral sockets 134 and cylindrical posts 144. This arrangement allows for each of the first and second light bodies 110 and 120 to rotate from zero to 90 degrees with respect to the rotary structure 130 at 45-degree increments. Thus, the hood light 100 may be positioned at a total of five angular settings with the first and second light bodies 110 and 120 positioned at 0, 45, 90, 135, and 180 degrees, as shown in FIGS. 8-10.

Referring now to FIG. 12-15, the first and second rotary hook handles 150 and 160 are described herein. In an embodiment, each hook handle is shaped to be held on sides of a hood of a vehicle. The structure described herein allows for the hook handles 150 and 160 to be rotated 360 degrees with respect to the corresponding first and second light bodies 110 and 120, thus providing a full range of pivoting motion for the hood light 100.

Figure 12A:
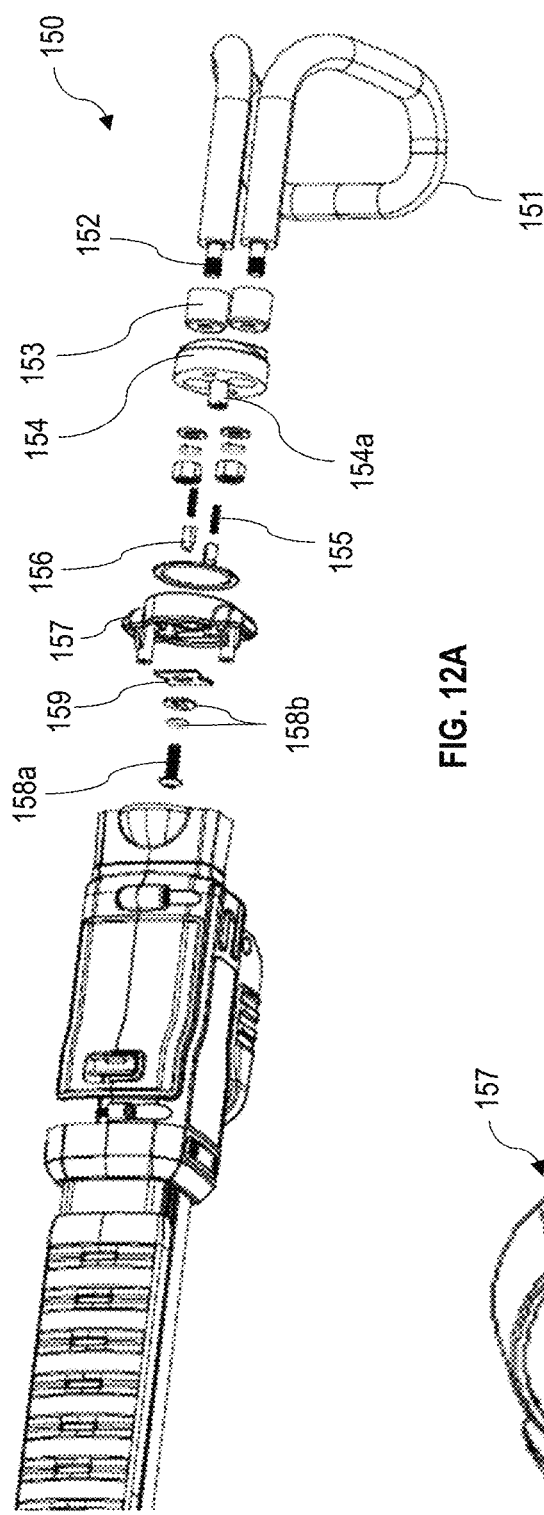
FIG. 12A depicts a partially exploded view of a rotary handle of the hood light, according to an embodiment.
Figure 12B:
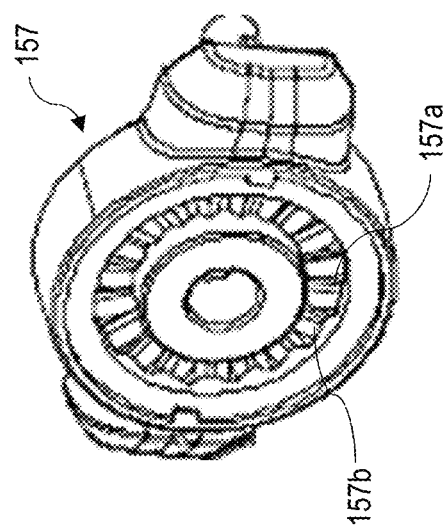
FIG. 12B depicts an exemplary view of a handle bracket cover for the rotary handle, according to an embodiment.

The rotary structure for attachment of the first hook handle 150 to end 119 of the first light body 110 is depicted and described herein with reference to FIG. 12 by way of example. In an embodiment, first hook handle 150 includes a handle portion 151 having a gripping surface and shaped to engage and hook onto the side of a hood of a vehicle. The ends of the handle portion 151 are provided with a set of hook pins 152. The hook pins 152 are attached to one face of the rotated plate 154 via a set of bushing bases 153 and tightened via a set of fasteners. The other face of the rotated plate 154 (facing the battery receptacle 117) mates with a handle bracket cover 157 via a fastener 158*a* received through the handle bracket cover 157 into an axial receptacle 154*a* of the rotated plate 154. One or more regular or spring washer 158*b* and a friction plate 159 is also provided on a back side of the handle bracket cover 157 where the fastener 158*a* is inserted. A set of two pivot springs 155 and two pivot posts 156 are received between the rotated plate 154 and the handle bracket cover 157. The pivot posts 156 are secured to the rotated plate 154 and engage annular detents 157*a* and projections 157*b* (FIG. 12B) on the handle bracket cover 157 as the rotated plate 154 is rotated about the pivot axis of the axial receptacle 154*a* (center axis) with respect to the handle bracket cover 157. This allows for the first hook handle 150 to rotate in 20-degree increments about the center axis.

Figure 13:
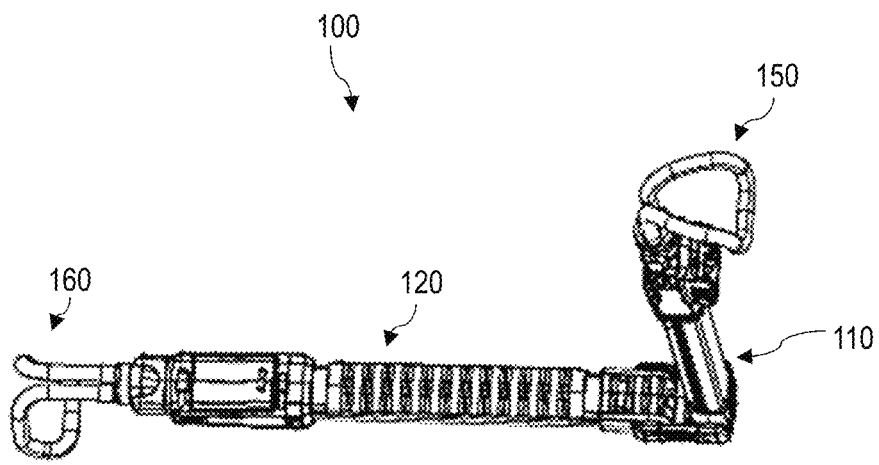
FIGS. 13-15 depict various angular orientations of one of the rotary handles relative to the hood light, according to an embodiment.
Figure 14:
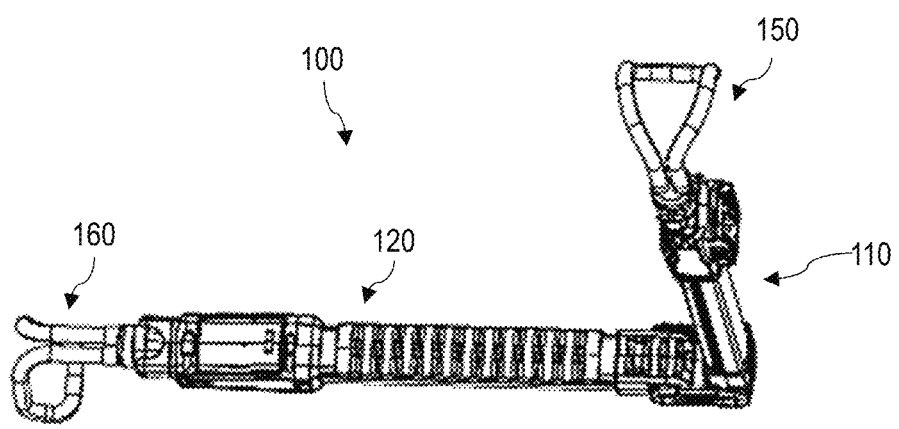
Figure 15:
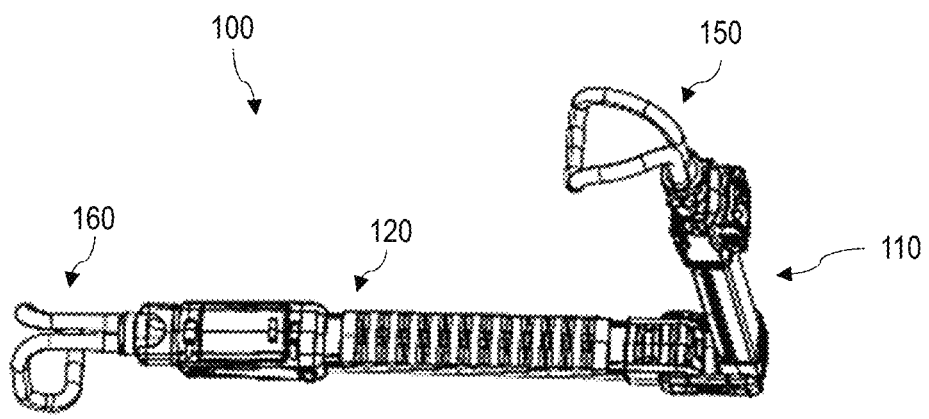
Figure 16:
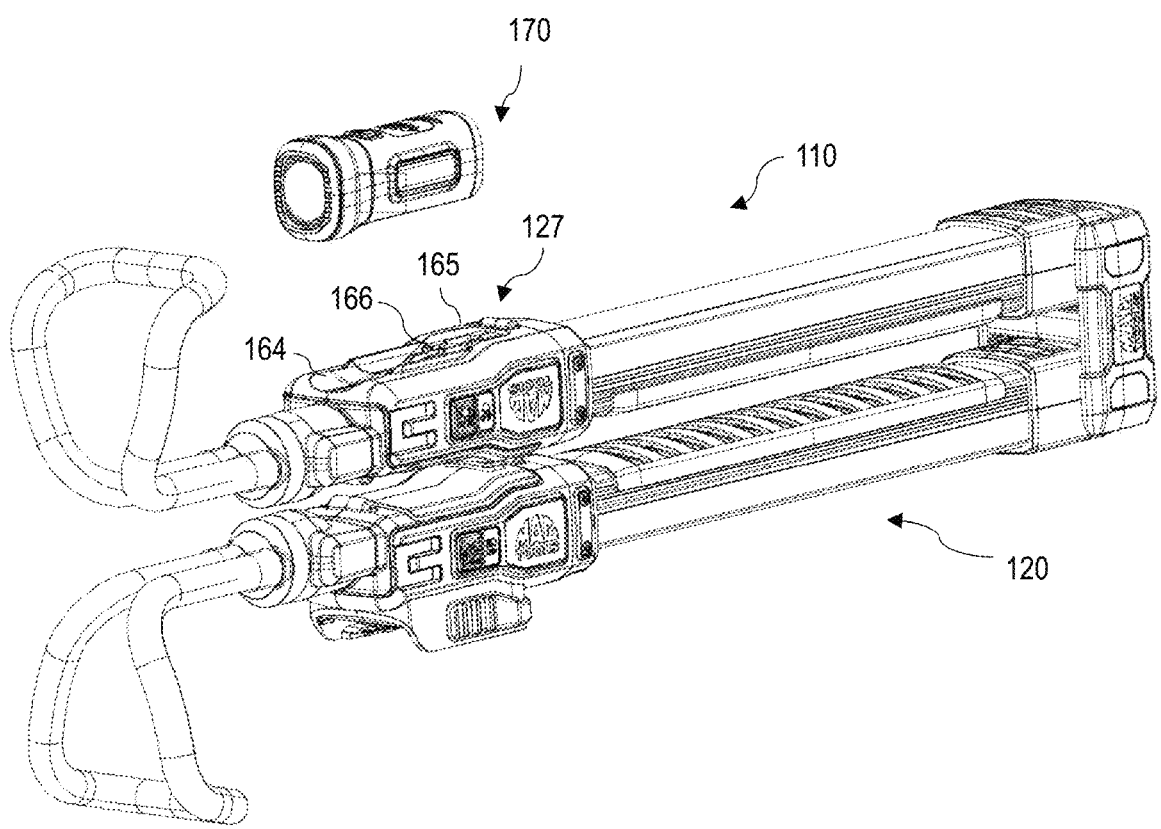
FIG. 16 depicts a perspective view of the hood light with a detachable light, according to an embodiment.
Figure 17:
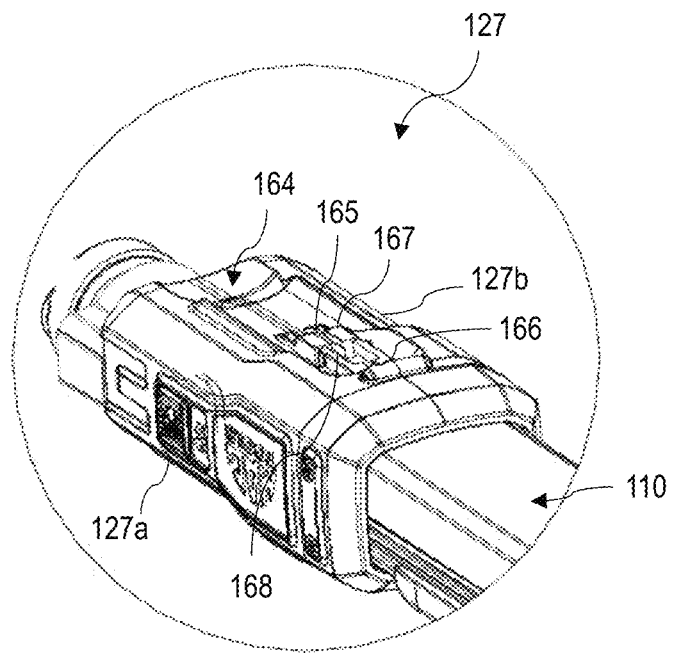
FIG. 17 depicts a partial perspective view of a detachable light mount for the hood light, according to an embodiment.
Figure 18:
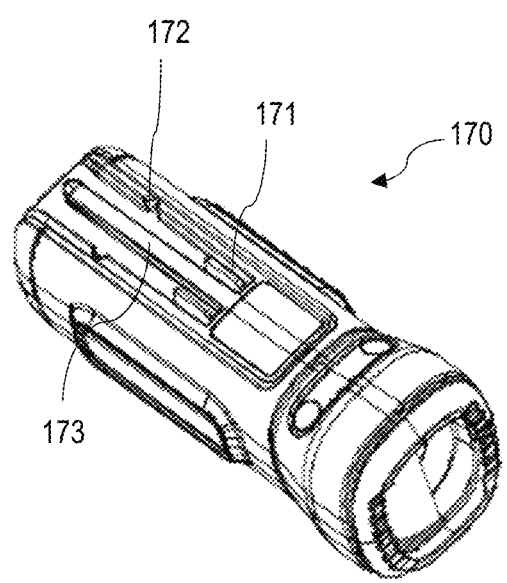
FIG. 18 depicts a perspective view of the detachable light, according to an embodiment.
Figure 19:
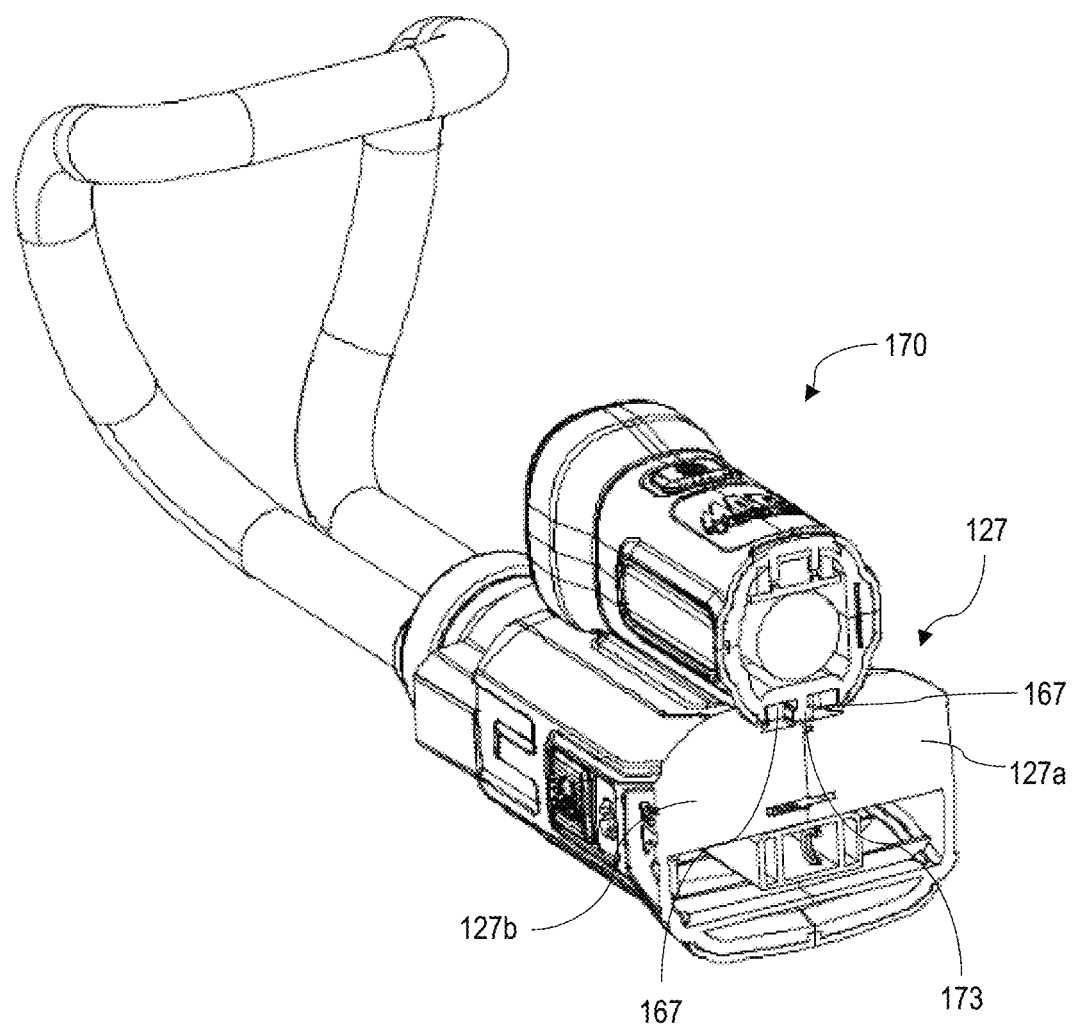
FIG. 19 depicts a cut-off perspective view of the detachable light mounted on the detachable light mount, according to an embodiment.

FIGS. 13-15 depict various rotational positions of the first hook handle 150 with respect to the first light body 110, according to an embodiment. The first hook handle 150 may rotate a full 360 degrees about the center axis with respect to the first light body 110 at 20-degree increments. This rotation is accomplished with application of sufficient force by the user to overcome the force of the pivot springs 155 as the pivot posts 156 engage the annular detents 157*a* and annular projections 157*b*.

The detachable light 170 is described herein with reference to FIGS. 16-19. In an embodiment, detachable light 170 is an LED flash light having one or more rechargeable battery cells. The detachable light 170 is relatively small and may be handled by the user for various uses. The detachable light 170 may be attached by the user to detachable light mount 127 of the hood light 100 for each access and recharging of the battery cells.

In an embodiment, the light mount 127, which is made up of two housing halves 127*a* and 127*b* mated together, includes a light mount face 164 having a curved platform for mounting the detachable light 170. A pair of light mount terminals 165 are disposed on the light mount 127 that mate with corresponding light terminals 171 of the detachable light for recharging the light battery cells. The light mount terminals 165 are disposed at an end of a pair of rail walls 167 disposed longitudinally on the light mount 127. A narrow elongate receiving channel 168 is formed between the rail walls 167 for receiving an elongate projection 173 of the detachable light 170. In an embodiment, elongate projection 173 and the rail walls 167 are provided with a tongue and groove locking mechanism so that the detachable light 170 is axially received and securely held over the light mount face 164 of the light mount 127.

In addition, in an embodiment, the rail walls 167 are provided with indentations 166 laterally projected from the rail walls 167, and the detachable light 170 is provided with two corresponding notches 172 facing the elongate projection 173. When the detachable light 170 is mounted, the indentations 166 engage the notches 172 to resiliently lock in the detachable light 170 on the light mount 127.

In an embodiment, the hood light 100 is additionally provided with a motion sensor 190. In an embodiment, the motion sensor 190 is housed by the mating surfaces of the first and second battery housing halves 117*a* and 117*b* adjacent the battery receptacle 117, though it may be alternatively placed in another part of the hood light 100. The motion sensor 190 activates a switch (now shown) placed on the current path from the battery receptacle 117 to the first and second PCBs 113 and 123 when it detects motion.

Figure 20:
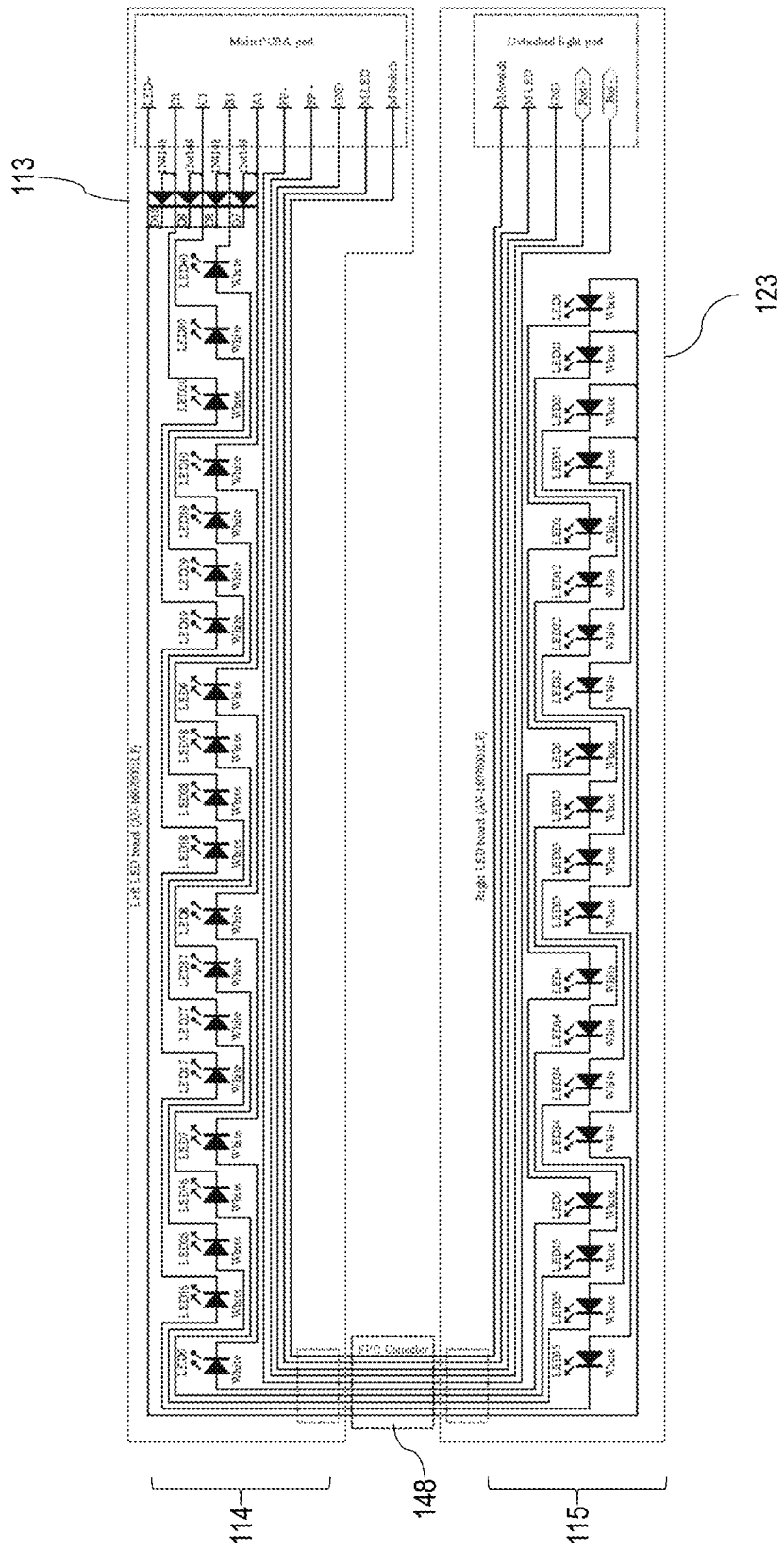
FIG. 20 depicts a simplified circuit diagram of first and second printed circuit boards including first and second LED arrays, according to an embodiment.

FIG. 20 depicts a simplified circuit diagram of the first and second printed circuit boards 113 and 123 including the first and second LED arrays 114 and 124, according to an embodiment. In an embodiment, the first and second LED arrays 114 and 124 are connected together via connector 148. In an embodiment, the LEDs are divided into four groups, where the LEDs within each group is connected together across the two LED arrays 114 and 124 via a designated connected. The LEDs from each group are disposed four spaces apart within the LED arrays 114 and 124. In the exemplary embodiment, each group includes 10 LEDs disposed four spaces apart across the two LED arrays 114 and 124. This arrangement ensures that if there is failure in one group of LEDs, it will not create a large dark spot within the LED array.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF NUMERIC REFERENCES

100 Hood light
110 First light body
111 First LED housing

112 Battery bracket
113 First printed circuit board
114 First LED array
115 First LED cover
116 First LED lens
117 Battery receptacle
117a First battery housing half
117b Second battery housing half
118 Battery terminal
119 End of battery receptacle
120 Second light body
121 Second LED housing
123 Second printed circuit board
124 Second LED array
125 Second LED cover
126 Second LED lens
127 Detachable light mount
127a First light mount housing half
127b Second light mount housing half
130 Rotary structure
131a First rotary housing half
131b Second rotary housing half
132 First light receiving body
133 Second light receiving body
134 Lateral socket
135 Gear base
136 Fastener
138 Ratchet gear
140 Compression spring
142 Inner post
144 Cylindrical post
146 Nut
148 Connector
150 First rotary hook handle
151 Handle portion
152 Pins
153 Bushing base
154 Rotated plate
154a Axial receptacle
155 Pivot spring
156 Pivot post
157 Handle bracket cover
157a Annular detents
157b Annual projections
158a Fastener
158b Spring washer
159 Friction plate
160 Second rotary hook handle
164 Light mount face
165 Light mount terminal
166 Indentations
167 Rail wall
168 Receiving channel
170 Detachable light
171 Light terminal
172 Notch
173 Elongate projection
190 Motion sensor

The invention claimed is:

1. A lighting device comprising:
a first elongate light body;
a second elongate light body;
a pair of handles coupled to first ends of the first and second elongate light bodies; and
a rotary structure disposed between second ends of the first and second elongate light bodies, the rotary structure comprising a rotary housing, a first light receiving body receiving the second end of the first elongate body, a second light receiving body receiving the second end of the second elongate body, a first ratcheting mechanism disposed between the rotary housing and the first light receiving body and defining a first pivot around which the first light receiving body rotates relative to the rotary housing, a second ratcheting mechanism disposed between the rotary housing and the second light receiving body and defining a second pivot around which the second light receiving body rotates relative to the rotary housing, wherein the first pivot is spaced apart and parallel to the second pivot, and each of the first and second light receiving bodies includes at least one spring and at least one ratchet gear arranged to bias an angular position of the first and second elongate light bodies relative to the rotary housing, respectively, between a plurality of angular settings angularly spaced apart at set increments.

2. The lighting device of claim 1, wherein the plurality of angular settings are 45 degrees apart.

3. The lighting device of claim 1, wherein the first light receiving body includes a first lateral socket around the first pivot, and the second light receiving body includes a second lateral socket around the second pivot, the first pivot and the second pivot receiving the at least one ratchet gear therein.

4. The lighting device of claim 1, further comprising an electric connector disposed within the two receiving bodies and the rotary housing to electrically connect the first elongate light body and the second elongate light body.

5. The lighting device of claim 1, wherein each of the first and second elongate light bodies comprises:
a housing;
an elongate circuit board mounted on the housing;
an array of light emitting diodes (LEDs) mounted on the circuit board; and
a lens mating with the housing to cover the array of LEDs.

6. A lighting device comprising:
a first elongate light body comprising a first housing, a first elongate circuit board mounted on the first housing, and a first array of light emitting diodes (LEDs) mounted on the first elongate circuit board;
a second elongate light body comprising a second housing, a second elongate circuit board mounted on the second housing, and a second array of light emitting diodes (LEDs) mounted on the second elongate circuit board;
first and second handles coupled to first ends of the first and second elongate light bodies; and
a rotary structure disposed between second ends of the first and second elongate light bodies to support rotary movement of the first elongate light body with respect to the second elongate light body;
a battery receptacle disposed on the first elongate light body at a distal end of the first array of LEDs opposite the rotary structure and intersecting an axis of the first array of LEDs, the battery receptacle receiving a removable battery pack along a first sliding axis substantially parallel to the axis of the first array of LEDs, the battery receptacle including battery terminals on its outer longitudinal surface arranged to electrically connect to the removable battery pack disposed on a same side of the first elongate light body as the first array of LEDs; and
a detachable light mount disposed on the second elongate light body at a distal end of the second array of LEDs opposite the rotary structure and intersecting an axis of the second array of LEDs, the detachable light mount being electrically connected to the battery receptacle and receiving a detachable light along a second sliding axis substantially parallel to the axis of the second array of LEDs, the detachable light mount including light mount terminals on its outer longitudinal surface arranged to electrically connect to the detachable light disposed on a same side of the second elongate light body as the second array of LEDs.

7. The lighting device of claim 6, wherein the detachable light comprises a flash light having a housing, a light disposed at a longitudinal end of the housing, a rechargeable battery within the housing charged via the detachable light mount, and light terminals extending longitudinally along a side of the housing to make contact with the light mount terminals.

8. The lighting device of claim 6, wherein the detachable light mount comprises a light mount face that houses the light mount terminals, at least one wall rail disposed longitudinally on the light mount face, and an elongate receiving channel for securely receiving a corresponding elongate projection of the detachable light therein.

9. The lighting device of claim 6, further comprising a motion sensor disposed on the first elongate light body and configured to control and/or interrupt supply of power from the battery receptacle to the first and second light sources.

10. The lighting device of claim 6, wherein each of the first and second elongate light bodies further comprise a lens.

11. The lighting device of claim 6, further comprising a pivoting structure for pivoting attachment of the first handle to the first end of the first elongate light body.

12. The lighting device of claim 11, wherein the pivoting structure comprises:
a handle bracket cover mounted to the first end of the first elongate light body and having annular detents; and
a rotary plate attached to the first handle and having a plurality of pivot posts engaging the annular detents to allow the first handle to rotate in set increments about an axis of the first elongate light body.

13. The lighting device of claim 12, further comprising a pin disposed on the axis of the first elongate light body to axially connect the handle bracket to the rotary plate.

14. The lighting device of claim 6, wherein the rotary structure comprises at least one spring and at least one ratchet gear arranged to bias a relative angular position of the first and second elongate light bodies between a plurality of angular settings angularly spaced apart at set increments.

15. The lighting device of claim 6, wherein the detachable light mount comprises one or more indentations engaging one or more notches of the detachable light to resiliently lock the detachable light to the detachable light mount.

16. A lighting device comprising:
an elongate light body supporting a light source, the elongate light body comprising at least one housing and an array of light emitting diodes (LEDs) supported by the at least one housing;
first and second handles coupled to outer ends of the elongate light body;
a battery receptacle disposed near one of the outer ends of the elongate light body between the first handle and a distal end of the array of LEDs, the battery receptacle receiving a removable battery pack along a sliding axis substantially parallel to an axis of the array of LEDs, the battery receptacle including battery terminals on its outer longitudinal surface arranged to electrically connect to the removable battery pack disposed on a same side of the elongate light body as the array of LEDs;
a motion sensor disposed on or adjacent the battery receptacle between the battery terminals and the array of LEDs, the motion sensor facing the same side of the elongate light body as the battery terminals and the array of LEDs, the motion sensor being arranged to detect a movement outside the lighting device and control supply of power from the battery pack to the light source accordingly.

17. The lighting device of claim 16, wherein the elongate light body comprises:
a first elongate light body;
a second elongate light body; and
a rotary structure disposed between inner ends of the first and second elongate light bodies to support rotary movement of the first elongate light body with respect to the second elongate light body.

18. The lighting device of claim 17, wherein each of the first and second elongate light bodies comprises:
a housing;
an elongate circuit board mounted on the housing.

\* \* \* \* \*